United States Patent [19]

Baumann

[11] Patent Number: 4,684,103

[45] Date of Patent: Aug. 4, 1987

[54] LEVER-AMPLIFIED ACTUATING MEANS FOR VALVES AND OTHER DEVICES

[76] Inventor: Hans D. Baumann, 32 Pine St., Rye, N.H. 03870

[21] Appl. No.: 900,323

[22] Filed: Aug. 25, 1986

[51] Int. Cl.$^4$ .................... F16K 31/165; F16K 7/16; F16K 31/44

[52] U.S. Cl. ....................................... 251/58; 74/110; 251/61.5; 251/280

[58] Field of Search ................... 74/110; 251/58, 61.5, 251/280

[56] References Cited

U.S. PATENT DOCUMENTS 4,549,719 10/1985 Baumann .......................... 251/58 X

FOREIGN PATENT DOCUMENTS 1003157 2/1957 Fed. Rep. of Germany ........ 251/58

Primary Examiner—Gerald A. Michalsky

[57] ABSTRACT

Lever-amplified actuating means for valves and other devices which may be used to replace heretofore employed hydraulic jacks capable of transforming a small force traveling a great distance into a large force being motivated over a small distance, and where such amplifying ratios exceed 5 to 1; the mechanical amplifying means consisting of two upper ball bearings displaced radially down by a piston or diaphragm plate which in turn causes a co-sinusoidal, small-distance displacement of a lower pair of ball bearings.

4 Claims, 2 Drawing Figures

LEVER-AMPLIFIED ACTUATING MEANS FOR VALVES AND OTHER DEVICES

BACKGROUND OF THE INVENTION

This invention relates to and offers certain improvements over my invention covered under U.S. Pat. No. 4,549,719 granted 10-29-1985.

The invention relates to mechanical amplifying means which may be used in place of previously employed hydraulic jacks and other hydraulic devices which are well-known to the experts in the field and which are capable of performing this task extremely well and with very high efficiencies; that is, very little of the translated work is lost by way of friction. Hydraulic devices fitting the above description are commonly used on tool machinery to position tools, to lift heavy loads such as machinery, for construction equipment and which are also used to close valve plugs against very high pressure differentials of liquid or gaseous media (see my U.S. Pat. No. 4,320,778).

However, one of the disadvantages of such hydraulic means to alter the force/distance relationship is that hydraulic devices are very susceptible to leakage and rams or piston rods have to be very precisely machined to avoid leakage between sliding stem seals especially when one considers the very high (usually on the order of 1,000-3,000 psi) hydraulic fluid pressures involved. Another disadvantage of hydraulic means is the very high coefficient of cubic thermal expansion which is especially troublesome when a valve to be closed handles a hot fluid, or when the precision-positioned machine tool becomes warm while performing work. Such undesirable thermal-expansion can lead to rather large positioning errors.

Certain mechanical amplifying means for actuators known to the state of the art are shown in U.S. Pat. Nos. 2,443,775, 2,395,223, 4,265,141, 4,270,398 and 3,941,362. All these known devices exhibit neither the simplicity nor the high amplifying ratio which can be achieved with my invention. For example, U.S. Pat. No. 3,941,362 uses a right triangle type toggle mechanism which amplifies only 4:1 (see column 2, line 25 of his specifications). Furthermore, there is no adjustment of his mechanism which in turn is very complex, requiring a cam profile and a two-stage amplification.

My invention overcomes these disadvantages by:
a. eliminating the requirement for a hydraulic fluid, not requiring fine surface finishes, sliding stem seals and the potential of a hydraulic leak; and
b. by utilizing all-metal parts in its construction, it is capable of operating over wide temperature ranges without experiencing significant positioning errors due to thermal-expansion problems.

In addition, my mechanical apparatus is very easy to handle, has a very high efficiency (similar to that of hydraulic systems) and can be produced very economically and without great need for precision.

As a result of the above-cited advantages, such mechanical amplifying means are now capable of replacing hydraulic amplifying and positioning means on valves such as the one shown in my U.S. Pat. No. 4,278,234, for example. Additionally, amplifying ratios of more than 15:1 are possible.

More advantages of my invention will become apparent when viewed in light of the following description.

DESCRIPTION OF THE INVENTION

Figure 1:
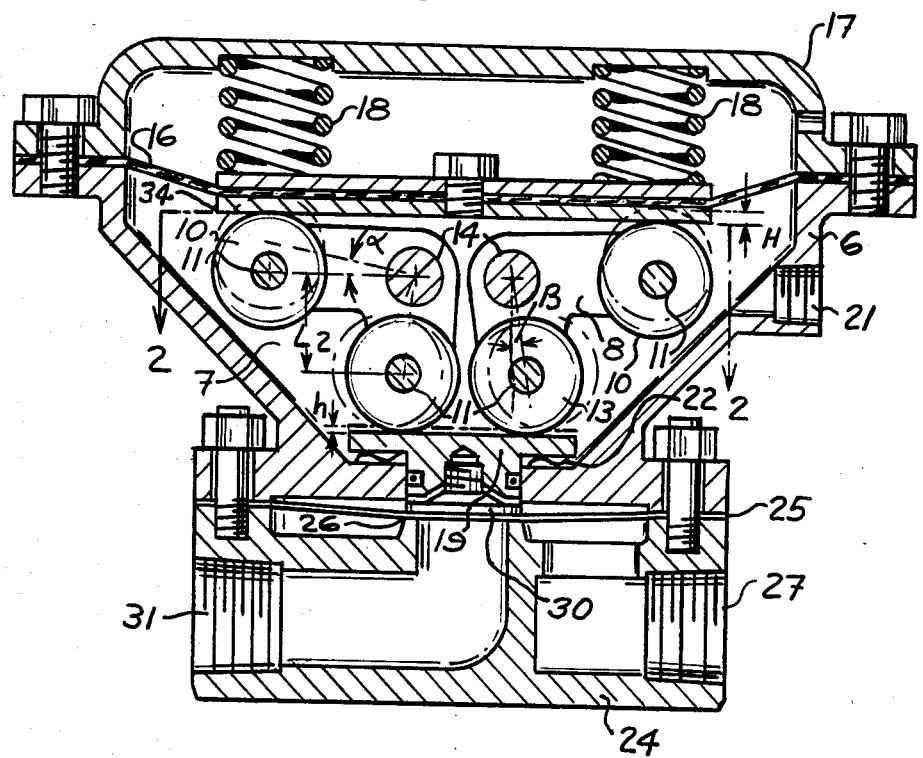
FIG. 1 is a vertical, central, cross-sectional view showing a preferred structure and arrangement of parts of my invention employed in conjunction with valving means.
Figure 2:
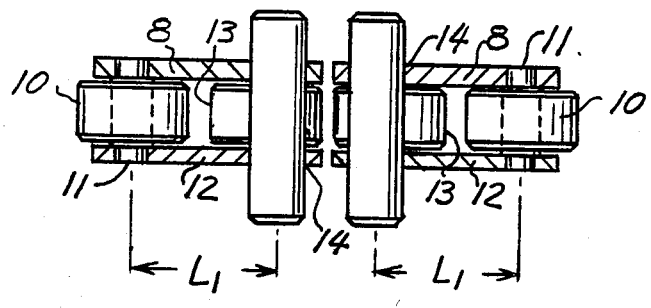
FIG. 2 is a horizontal, partial view of the amplifying portion of my invention taken along the lines 2—2 in FIG. 1.

The subject invention comprises a housing (6) having a central opening (7) to receive a pair of toggle means (8) mounted between wall portions of housing (6). Each toggle means (8) is comprised of one or more upper ball bearings (10) mounted on a shaft (11) between a pair of plates (12) plus one or more lower ball bearings (13) equally as well-supported by shafts (11) between said plates (12). In a preferred configuration, both upper and lower bearings are spaced equal distance from a diaphragm plate (34) capable of pushing the upper ball bearings (10) down to a cause a free-tilting motion of said toggle means (8) around the axis of bore (14).

Diaphragm plate (34) is supportive of an elastomeric diaphragm (16) which in turn is clamped between housing (6) and a cover (17). Plate (34) is further opposed by a number of coiled compression springs (18). An instrument air signal usually from 3 to 15 psi is administered through opening (21) and under diaphragm (16) forcing plate (34) to lift; this in turn causes a tangential displacement and a tilting motion of the toggle element (8) over the axis of bore (14), which in turn, causes an increase in angle $\beta$ which then reduces the distance $L_2$ by the difference between the co-sine of the former angle $\beta$ multiplied by the distance between the center of bore 14 and the center of bearing 13 and the co-sine of the larger angle $\beta$ multiplied by the same center distance. Such a shortening of the co-sinusidal distance $L_2$ now forces an upward motion "h" of a displacement piston (19) pushed by a wave spring (22).

The overall amplifying ratio of this mechanical arrangement is the ratio between vertical motion of plate (34) divided by the vertical motion of displacement piston (19). A typical amplifying ratio of 16 to 1 can be achieved by using a $\beta$ angle of 10° and then decreasing the $\beta$ angle to 5°.

Such a change in angle $\beta$ by 5° also causes an identical change in angle $\alpha$. However, the displacement "H" is a function of sinus $\alpha$ multiplied by $L_1$ while distance "h" is a function of cosine $\beta$ multiplied by $L_2$. Since cos 10°−cos 5°=0.011 and sinus 5°=0.087, a natural advantage of 8:1 is achieved, which can further be enlarged to 16:1 by doubling the distance $L_1$ over $L_2$.

When connected to a valve (24), displacement piston (19) can be used to force a metal diaphragm (25) against a valve orifice (26) causing the disruption of fluid flow between ports (31) and (27).

Air signal entering at (21) can now be used to cause diaphragm (25) to lift off orifice (26) and cause fluid to flow.

In order to overcome machining tolerance in the accumulated distances between the lower surface of plate (34) and the valve orifice (26), displacement piston (19) may be configured in two parts; the lower one (30) of which has a threaded extension which can be screwed in or out of the upper portion of displacement piston (19) to effect such a correction in distance.

By simply placing springs (18) under diaphragm plate (34) and admitting an air signal through a suitable opening into cover (17), the process can be reversed. Now the plate (34) will normally be up and bearings (10) and (13) in the upper i.e., dashed positions, with valve orifice (26) uncovered. Now the air signal will be able to press plate (34) down and cause orifice (26) to be covered.

Since my invented amplifying means can create substantial forces, such as 1,000 lb. force exerted upon diaphragm (25) with only 65 lb. force input by plate (34), the same diaphragm (25) can be subjected to very high fluid pressures and still allow tight shutoff of valve port (26). Furthermore, since all static forces acting on bearings and shafts are uni-directional, there is no loose play that may effect the position of the translated motion leading to an extremely accurate positioning of displacement piston (19). It should also be noted that with the use of ball bearings there is very little friction involved and the angle $\beta$, for example, can be reduced to less than 5° without leading to self-locking of the mechanical parts.

Having thus shown and described the invention, what is claimed as new and desired to be secured by letter patent is described in the following claims:

1. Lever-amplified actuating means for valves and other devices comprising:
    a. one pair of toggle elements mounted in spaced relationship within a housing having a central opening, each of said toggle elements pivotably supported by shaft means which are suitably retained within a said housing;
    b. each of said toggle elements comprising at least one upper bearing suitably supported essentially level to said shaft means, and at least one lower bearing suitably rotatably supported below said shaft means;
    c. displacement means mounted within the lower portion of said central opening of said housing and being engaged to said lower bearings;
    d. plate means mounted within the upper portion of the housing opening having a flat lower surface being subjected to rolling motion of the upper bearings and capable of engaging and displacing said upper bearings down and thereby pivoting said pair of toggle elements around said shaft means, said pivoting motion further causing said lower bearings to extend their co-sinusidal distance with respect to the supporting shaft means and thereby causing a downward motion of said displacement means.

2. Lever-amplified actuating means for valves and other devices as described in claim 1, having retaining means to close up the upper portion of the central opening of said housing and wherein said retaining means encloses at least one coiled spring capable of exerting a downward force onto said plate means.

3. Lever-amplified actuating means for valves and other devices as described in claim 1, where said displacement means is cooperating with closure means capable of opening and closing a valve orifice.

4. Lever-amplified actuating means for valves and other devices as described in claim 3, when said displacement means is arranged to have an adjustable portion capable of changing the distance between said lower bearings and said valve orifice.

* * * * *